United States Patent
Hyman et al.

(10) Patent No.: US 11,206,238 B2
(45) Date of Patent: **\*Dec. 21, 2021**

(54) SYSTEMS AND METHODS FOR CONTROLLING DELIVERY OF USER MESSAGES

(71) Applicant: Braze, Inc., New York, NY (US)

(72) Inventors: Jonathan Hyman, New York, NY (US); William Magnuson, New York, NY (US); Kevin Wang, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/067,110

(22) Filed: Oct. 9, 2020

(65) Prior Publication Data

US 2021/0029072 A1 Jan. 28, 2021

Related U.S. Application Data

(63) Continuation of application No. 16/255,254, filed on Jan. 23, 2019, now Pat. No. 10,887,273.

(51) Int. Cl.
*H04L 12/58* (2006.01)
*H04L 29/08* (2006.01)

(52) U.S. Cl.
CPC ............ *H04L 51/36* (2013.01); *H04L 51/046* (2013.01); *H04L 67/26* (2013.01)

(58) Field of Classification Search
CPC ........ H04L 51/36; H04L 51/046; H04L 67/26
See application file for complete search history.

(56) References Cited

U.S. PATENT DOCUMENTS

| | | | |
|---|---|---|---|
| 9,299,078 B2 | 3/2016 | Gierkink | |
| 9,384,242 B1 | 7/2016 | Varadarajan | |
| 9,584,465 B2 | 2/2017 | Arquette | |
| 9,813,495 B1 | 11/2017 | Van Rensburg | |
| 10,178,059 B1 | 1/2019 | Garg | |
| 10,387,559 B1 | 8/2019 | Wendt | |
| 10,997,662 B1 * | 5/2021 | Warfel | G06Q 30/0269 |
| 2009/0144201 A1 | 6/2009 | Gierkink | |
| 2010/0031180 A1 | 2/2010 | Shin | |
| 2014/0006139 A1 | 1/2014 | Aggarwal | |
| 2015/0350132 A1 | 12/2015 | Karnin | |
| 2016/0148256 A1 * | 5/2016 | Chavarria | G06Q 30/0255 705/14.53 |
| 2016/0253710 A1 | 9/2016 | Publicover | |
| 2016/0255034 A1 | 9/2016 | Yuan | |
| 2016/0267541 A1 | 9/2016 | Breakey | |
| 2016/0283585 A1 | 9/2016 | Zheng | |
| 2016/0306804 A1 | 10/2016 | Varadarajan | |
| 2018/0013698 A1 | 1/2018 | Vendrow | |
| 2018/0091467 A1 | 3/2018 | Andrianakou | |
| 2019/0028421 A1 | 1/2019 | Duchastel | |

\* cited by examiner

*Primary Examiner* — Mohamed A. Wasel
(74) *Attorney, Agent, or Firm* — FisherBroyles, LLP

(57) ABSTRACT

Systems and methods for determining whether to send a message to a user take into account a pressure score for the user that is indicative of how receptive the user is to receiving messages. The user's pressure score can vary depending on user behavior. Multiple pressure scores relating to different respective topics or subjects may be maintained for the user.

14 Claims, 7 Drawing Sheets

SYSTEMS AND METHODS FOR CONTROLLING DELIVERY OF USER MESSAGES

This application is a continuation of U.S. application Ser. No. 16/255,254, which was filed on Jan. 23, 2019, the content of which is hereby incorporated by reference.

BACKGROUND OF THE INVENTION

The invention is related to systems and methods for enhancing customer engagement. In part, enhanced customer engagement is accomplished by a company sending messages to its users. The messages could be mobile or browser-based push notifications, text (SMS/MMS) messages, email messages, in-app messages, an audio recording that is sent to users via a telephony system, or some other form of messaging.

A company may directly send a message to its users, or the company may hire a vendor to send a message to its users. If an outside vendor is used, the company typically will provide the content of the message, and the company will identify which users are to receive the message.

The users who receive a message from a company tend to have different attitudes towards receiving such a message. Different users have different propensities to derive value from the message. As a result, some users will welcome the message and immediately read/play the message, while other users may ignore the message completely.

It is difficult for a company sending such messages, or for an outside vendor responsible for sending such messages on behalf of the company, to know in advance whether an individual user is likely to be receptive to a message. Indeed, an outside vendor is unlikely to have any detailed information regarding the preferences and characteristics of individual users. For that reason, most companies will send a message to all of their users, or at least to all of their users that might potentially find value in the message. Unfortunately, by operating in this fashion the company runs the risk of alienating certain users that find the message unwelcome. If a company repeatedly sends messages to a user who does not want to receive messages or who finds little or no value in the company's messages, the user may discontinue any affiliation with the company.

DETAILED DESCRIPTION OF PREFERRED EMBODIMENTS

Figure 1:
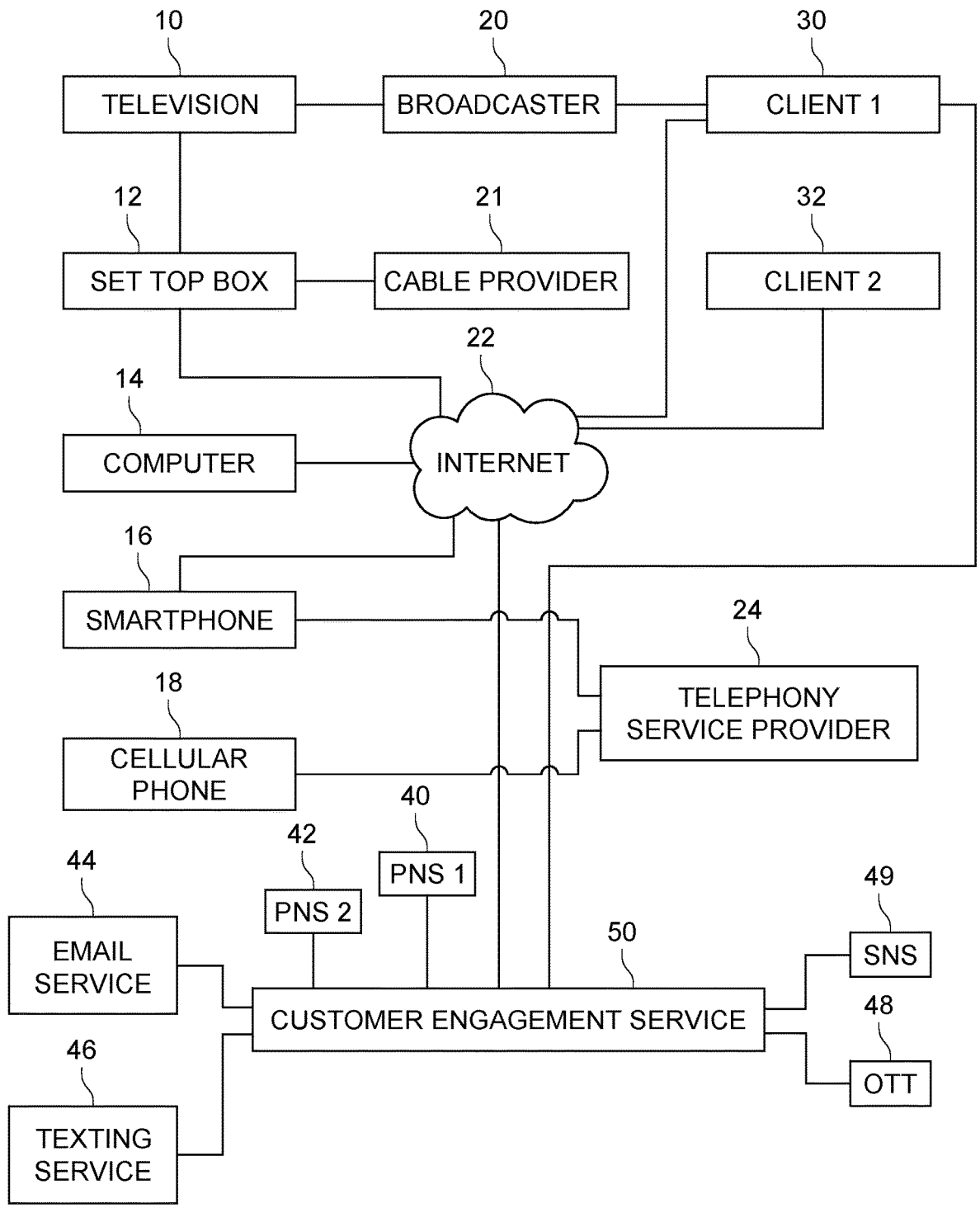
FIG. 1 is a diagram of a communications environment which could be utilized by systems embodying the invention to perform methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. The customer engagement service helps a company interact with its users to enhance the customer experience and to increase the company's business, revenue and/or stature. One of the ways that a customer engagement service assists a company is by helping the company manage how and when messages are delivered to the company's customers. Details about how a customer engagement service operates are provided below.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a software application. Often the software application is one created by the client company and provided to the client's users. The software application could be one that is resident on a computer, a smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

A customer engagement service embodying the invention is similar to a traditional message delivery service in certain limited respects. For example, a client could ask a customer engagement service to send a message to its users just as it might ask a message delivery service to send a message to its users. However, unlike a traditional message delivery service, a customer engagement service actively manages and orchestrates how the message is delivered to users. In addition, in many cases the customer engagement service does not actually send the message, as would a traditional message delivery service. Instead, the message delivery service manages the delivery of the message to users via third party message delivery services.

In addition, and for reasons that will be explained below, a customer engagement service typically has considerably more information about the users and the users' behavior than would be available to a typical message delivery service. This additional information is used to help manage, control and orchestrate the delivery of a client's message to multiple users to achieve various purposes.

Systems and methods embodying the invention are designed to limit or control the delivery of messages to a user in instances where the customer engagement service detects or infers that the user may not be receptive to messages. The aim is to improve an individual user's overall experience by reducing or preventing the delivery of messages to the user that the user may not find useful or interesting, or that the user may not welcome.

In some instances, the customer engagement service may limit or reduce the delivery of messages to a user when the messages relate to a particular topic or subject. This is done because information about the user, including past actions taken by the user, indicate that the user may not be receptive to messages relating to that topic or subject.

In other instances, the customer engagement service may limit or reduce the delivery of a certain type of message to a user. For example, the customer engagement service may reduce or limit the number of text messages that are sent to a user, while simultaneously allowing a normal flow of push notifications to be sent to the user. This would be done because information about the user, including past actions taken by the user, indicate that the user is not receptive to text messages, but welcomes push notifications.

As will be explained below, a customer engagement service embodying the invention is able to gather more information about users' preferences and activity than a traditional message delivery service. That information can be used to help determine whether a user is not presently receptive to a certain client's messages, to determine whether the user is not receptive to messages relating to a particular topic or subject and/or to determine whether the user is not receptive to certain types of messages.

In situations where the customer engagement service is managing and orchestrating the delivery of messages from multiple clients to the same user, the customer engagement service can use information about the how the user reacts to messages sent from all of the clients to draw conclusions about the user's receptivity to messages in general, to messages that relate to a certain topic or subject and/or to messages of a certain type. Thus, the customer engagement service may have more information about the user's preferences and receptivity to messages than any individual client. As a result, the customer engagement service is in a uniquely informed position to help manage the delivery of messages to the user to ensure the user has a positive experience.

FIG. 1 illustrates a communications environment in which a customer engagement service embodying the invention could exist. Before explaining the details of the customer engagement service, we will first discuss the communications environment.

As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television 10 and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application resident on the user's computer 14 might also be used to access media content provided by client one 30 via the Internet 22.

Yet another user may have a smartphone 16 that is capable of communicating over the Internet 22 and/or via a telephony service provider 24. A software application on the user's smartphone 16 could be used to access media content provided by client one 30 via the Internet 22 or via the telephony service provider 24.

Still another user might have a cellular telephone 18 that is capable of receiving text messages. This would allow the user of the cellular telephone 18 to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides a user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that could be utilized by users to receive messages from a client, and that could be used to interact with a client. In reality, there would be a very large number of user devices in such a communications environment. Also, a single user could possess and use multiple devices to access client services and to receive messages from a client. Thus, the depiction in FIG. 1 should in no way be considered limiting.

Figure 2:
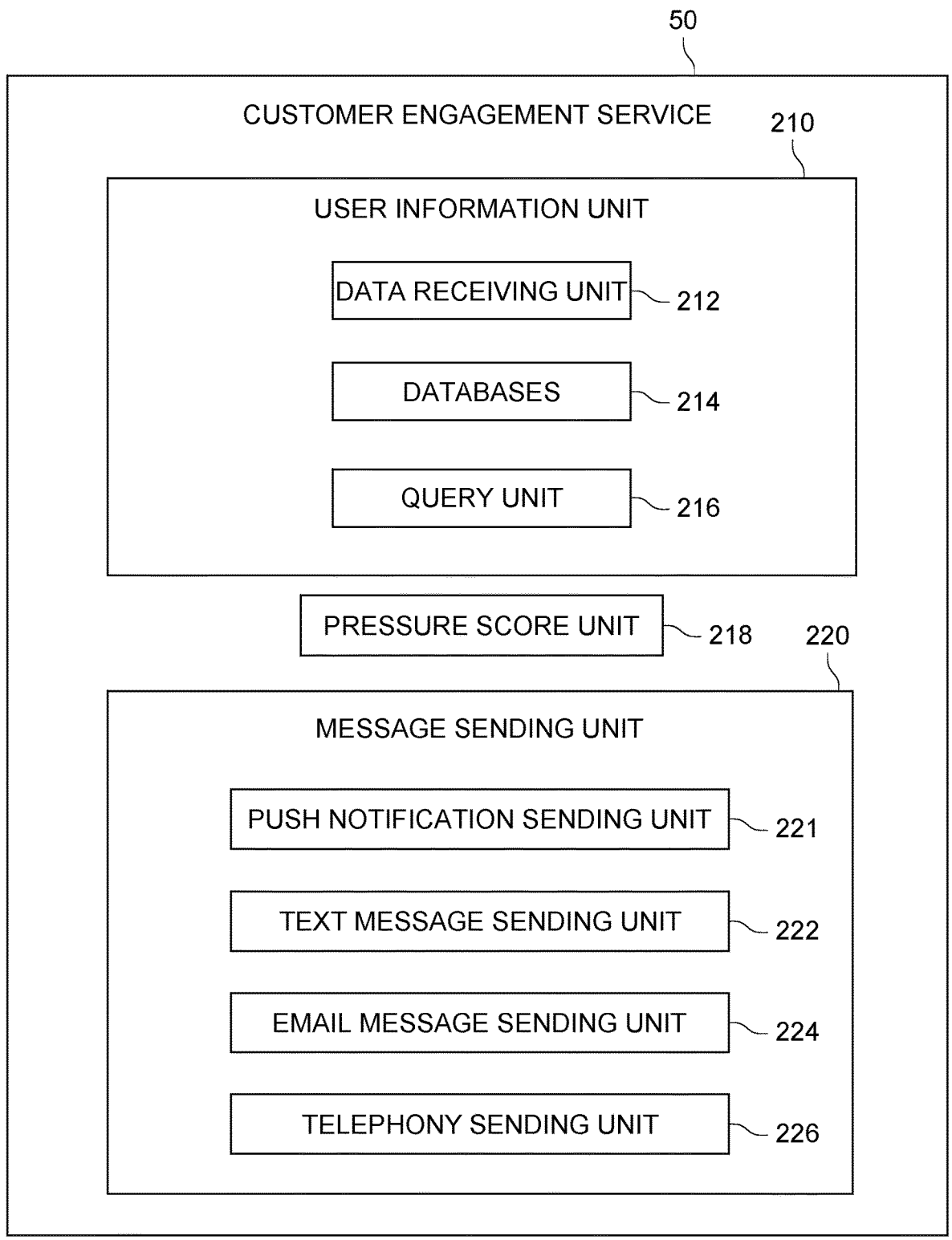
FIG. 2 is a diagram illustrating selected elements of a customer engagement platform.

FIG. 2 illustrates selected elements of a customer engagement service 50. The illustration in FIG. 2 is in no way intended to show all elements of a typical customer engagement service 50. Indeed, a typical customer engagement service 50 would include many other elements. Likewise, a customer engagement service 50 embodying the invention might not have all the elements illustrated in FIG. 2.

The customer engagement service 50 includes a user information unit 210 that is responsible for receiving and storing information about a client's users. The user information unit 210 also responds to requests for the information stored within its databases. The user information unit 210 includes a data receiving unit 212 that receives various items of information about users, and that stores that received information in databases 214. The information could be received from various sources. However, typically, a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send information about that purchase to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

The data receiving unit 212 may also receive information about how individual users react to the receipt of client messages. If the customer engagement service 50 causes a push notification to be sent to a user via a push notification service 40/42, the push notification service 40/42 that sends the push notification to the user may report whether the user opened and viewed the push notification. That report can include the time at which the push notification was sent to the user, and the time at which the user opened and viewed the push notification. This information could be reported to the data receiving unit 212, which then stores this information in the databases 214.

In a similar fashion, when the customer engagement service 50 sends other types of messages to a user, such as text messages, email messages or audio messages, the delivery service that sends the message to the user can report back about when the message was sent, and whether and when the user opened and/or viewed and/or listened to the message. Of course, information about whether and when a user opened or viewed a message could be obtained by the user information unit 210 in other ways. The obtained information is then recorded in the databases 214.

In yet another example, the customer engagement service 50 may cause a message to be delivered to a user via an in-application messaging capability of a software application that was provided to the user by a client. In that instance, the software application or the client that provided and monitors the software application may notify the customer engagement service 50 about when the message was delivered and whether and when the user accessed and viewed the message. Here again, the reported information is recorded in the databases 214.

Because the customer engagement service 50 is able to obtain information about how individual users react to the messages they receive, the customer engagement service 50 can use this information to determine an individual user's receptivity to messaging in general, to messages that are directed to a particular topic or subject, and to messages of a certain type. The information can also indicate that a particular user is receptive to a first type of message during certain days and times, but is receptive to a second different type of message at other days and times.

The customer engagement service 50 may also receive information that indicates whether and when the user takes an action in response to receipt of a message. For example, because the data receiving unit 212 is also receiving information from the clients regarding user contacts with the clients, the customer engagement service 50 may learn that shortly after an individual user received a message from a client, the user logged into the client's website. Or that shortly after the user received a message from a client, the user opened a software application provided by the client.

For all the reasons outlined above, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users. The obtained information can be used to control and orchestrate the delivery of messages to users to help improve and control the user experience.

The customer engagement service 50 also includes a pressure score unit 218. Details of the pressure score unit 218 are provided below. Briefly, the pressure score unit 218 maintains one or more pressure scores for individual users. The pressure scores are used to predict how receptive a user will be to receipt of messages. Thus, pressure scores can be used to help control or limit the delivery of messages to users to improve the users' overall experience.

The customer engagement service 50 also includes a message sending unit 220. The message sending unit 220 is responsible for causing messages to be sent to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

Regardless of the type of message or the delivery mechanism, the message sending unit 220 could format the messages in ways specified by the client, or in ways that the customer engagement service 50 believes will be desirable or attractive to users. Also, the customer engagement service 50 might itself be responsible for delivering the message to users, or the customer engagement service 50 may utilize the services of third parties to deliver the message to users. In some instances, messages may be delivered to users via a combination of the customer engagement service 50 and outside vendors.

Figure 3:
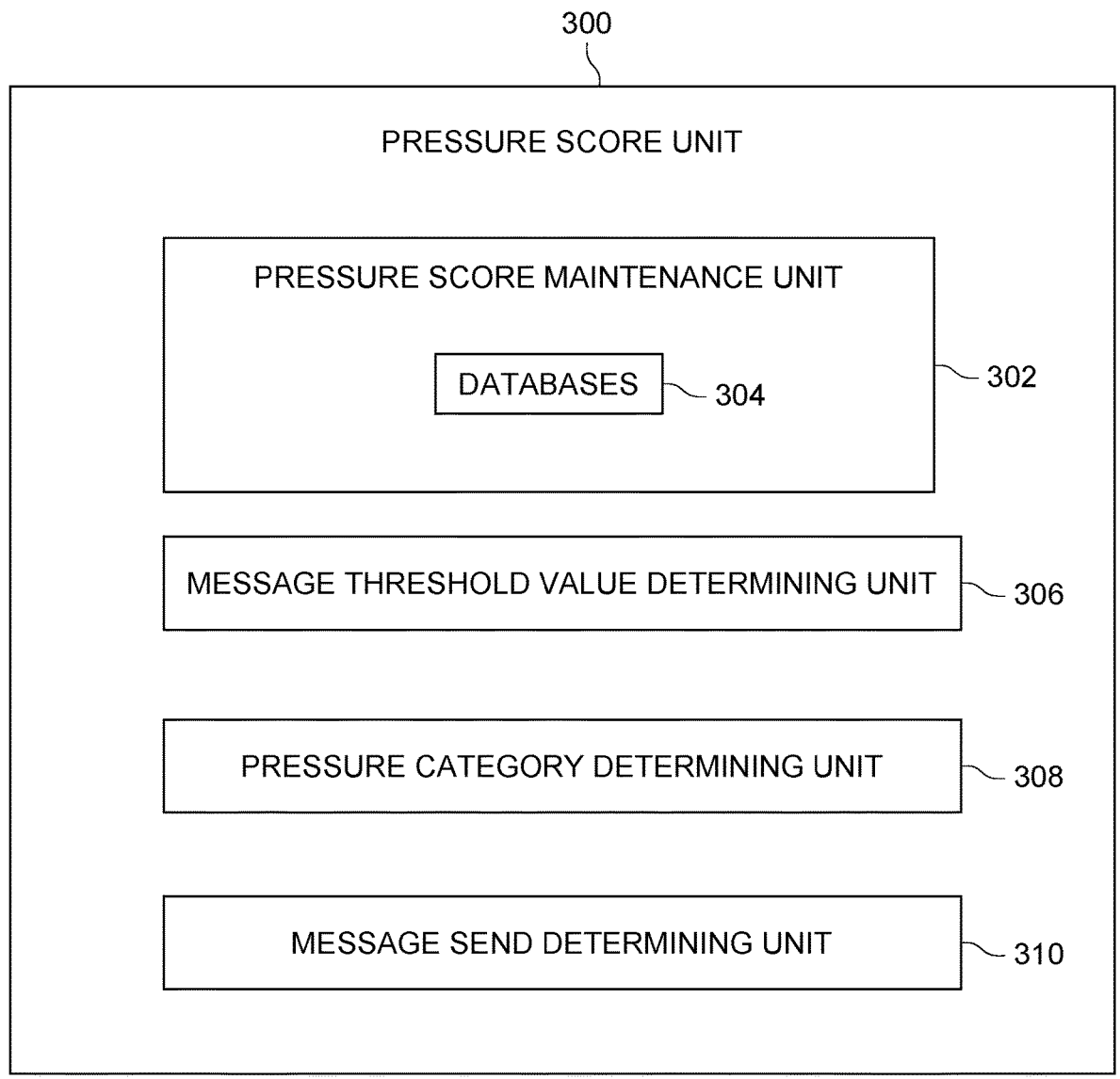
FIG. 3 is a diagram illustrating selected elements of a pressure score unit that can be part of a customer engagement platform.

FIG. 3 illustrates selected elements of a pressure score unit 300. As noted above, the pressure score unit 300 maintains and updates one or more pressure scores for individual users. As will be explained below, the pressure scores are used to help determine whether and when to send messages to an individual user, perhaps the type of message to send to a user, and/or when to limit the delivery of messages to an individual user.

The pressure score unit 300 includes a pressure score maintenance unit 302 that is responsible for maintaining and updating one or more pressure scores for individual users. Those pressure scores could be stored in databases 304 that are part of the pressure score maintenance unit 302. Alternatively, some or all of the pressure scores could be stored in the databases 214 that are part of the user information unit 210.

The pressure score unit 300 also includes a message threshold value determining unit 306 that determines a message threshold value for individual messages. As will be explained below, a user's pressure score(s) and the message threshold value assigned to a message can be used to together to determine whether to send a message to a particular user.

The pressure score unit 300 also includes a pressure score category determining unit 308 that is responsible for determining that a message belongs to a particular category or subject or topic. The categories themselves can vary widely depending on the client that is sending the message.

For example, if the client is an online retailer, messages for that client could be categorized into product announcements, sale notifications, general user information, as well as other categories. The pressure scores that are maintained for the client's users could include multiple pressure scores for each individual user, one pressure score for each category of message. As a result, when the customer engagement service 50 is considering sending a message to this client's users, the pressure category determining unit 308 may first examine the message to determine into which category the message belongs. Then, for an individual user, a message send determining unit 310 of the pressure score unit 300 will obtain or determine the pressure score for the user that corresponds to that category. The message send determining unit 310 then decides whether the message should be sent to that user based on the user's pressure score for that category of message.

In another example, if the client is a media content provider, the categories established for the client could be subject matter categories. For example, the categories could be politics, sports and entertainment, as well as other categories. The pressure scores that are maintained for this client's users could include multiple pressure scores for each user, one for each of the subject matter categories. When a message is to be sent for this client, the pressure category determining unit 308 would first determine the subject matter category into which the message falls. The message send determining unit 310 would then use the pressure score for a user in that subject matter category to determine whether the message should be sent to the user.

With the above as background, we will now turn to a description of various methods embodying the invention that relate to using pressure scores to control the delivery of messages to users. This description is provided in conjunction with the flowchart illustrated in FIG. 4.

Perhaps the simplest situation is where a single pressure score is maintained for each user. The single pressure score is then used to determine whether to send a message to a user. Assuming that is the situation, the method 400 would begin and proceed to step S402, where the customer engagement service 50 receives a message from a client that is to be sent to some or all of the client's users. The instructions received from the client may identify a candidate group of users to which the message may be sent, or the client may indicate that the candidate group of users includes all of the client's users. The client then relies upon the customer engagement service 50 to determine who should receive a copy of the message.

The method then proceeds to step S404, where the message send determining unit 310 obtains a pressure score for the first candidate user. The method then proceeds to step S406 where the message send determining unit 310 determines if the message should be sent to this user. That determination is based on the user's pressure score.

As will be explained in greater detail below, a user's pressure score is indicative of how receptive the user is to receiving new messages. In the embodiments described below, a low pressure score indicates that the user is more receptive to new messages, and a high pressure score indicates that the user is less receptive to new messages. Of course, in alternate embodiments this convention could be reversed such that a low pressure score indicates a user is less receptive to new message and such that a high pressure score means that the user is more receptive to new messages.

Once a user's pressure score is obtained in step S404, the method proceeds to step S406, where a message send determining unit 310 uses the user's pressure score to determine if the message should be sent to the user. The determination made in step S406 could be as simple as determining if the user's pressure score is above or below a threshold value. For example, the message send determining unit 310 could compare the user's pressure score to a threshold value of 10. If the user's pressure score is equal to or lower than 10, then the message send determining unit 310 determines that the message should be sent to the user. If the user's pressure score is greater than 10, the message send determining unit 310 determines that the message should not be sent to the user.

If the determination made in step S406 is that the message should not be sent to the user, the method proceeds to step S408, where a check is performed to determine if all candidate users have been processed. If so, the method ends. If not, the method loops back to step S404, where the message send determining unit 310 obtains a pressure score for the next user in the candidate list of users who might receive a copy of the message. The method then proceeds on to step S406 and a determination is made as to whether the message should be sent to the next user based on the next user's pressure score.

If the check performed in step S406 indicates that the message should be sent to a particular user, the method proceeds to step S410. In step S410, the message sending unit 220 of the customer engagement service 50 sends the message to that user. The method then proceeds to step S412, where a check is performed to determine if all candidate users have been processed. If so, the method ends. If not, the method loops back to step S404, where the message send determining unit 310 obtains a pressure score for the next user on the candidate list of users who might receive the message.

The method will continue looping through the above-described steps until a check performed in step S408 or S412 indicates that all candidate users have been processed, and the method ends.

In the method described above, only a single pressure score is maintained for each user. In alternate methods, multiple pressure scores may be maintained for each user. The multiple pressure scores for each user could correspond to different categories of messages for a single client, where a user has a different pressure score for each category of message. In that case, the pressure score for the user obtained in step S404 would be the pressure score for the appropriate message category.

Where multiple pressure scores are maintained for each user, it is necessary to determine which pressure score to use when making a determination as to whether a message will be sent to a user. Thus, a method embodying the invention may include an additional step where a pressure category determining unit 308 of the pressure score unit 300 checks the message to determine into which category the message belongs. Once that determination is made, then step S404 involves obtaining the user's pressure score for that determined message category.

The description provided above explained that the categories of messages could vary from client to client. In addition, the categories may relate to the type of message being sent. For example, a single user could have a first pressure score for push notifications, a second pressure score for text messages, a third pressure score for email messages, etc. In this situation, the pressure score obtained in step S404 would be the user's pressure score for the type of message that is being sent.

Moreover, a single user that receives messages from multiple different clients could have a different pressure score for each client, or perhaps multiple different pressure scores for each client. In that event, the pressure score that is obtained in step S404 would be the pressure score for the client that is sending the message, or perhaps the pressure score for the appropriate category of message for the client that is sending the message.

As will be explained in greater detail below, a message that is to be sent to a user might also have an associated message threshold value. For example, a message that is determined to likely be of great interest to almost all users could be assigned a relative high message threshold value. A message that is determined to be of little interest to many users may be assigned a low message threshold value.

When the message that is to be sent to users has an associated message threshold value, then in step S406 the user's pressure score is compared to the message threshold value to determine if the user's pressure score is equal to or lower than the message threshold value. If a message has a high message threshold value, indicating the message is likely to be interesting to almost all users, then even users with a high pressure score (indicating they are generally not receptive to new messages) will still receive the message. If a message has a relative low message threshold value, indicating the message is not particularly interesting to most users, then the message will only be sent to those users with a low pressure score (indicating they are highly receptive to new messages).

A method of maintaining a pressure score for a user will now be described with references to the flowchart illustrated in FIG. 5. In this method, a single pressure score is maintained and updated for a single user.

The method 500 begins and proceeds to step S502, where the message sending unit 220 of a customer engagement service sends a message to a user. The method then proceeds to step S504, where a pressure score maintenance unit 302 of the pressure score unit 300 determines whether the user opens or views the message. As explained above, information about whether and when a user opens and views or listens to a message can be reported to the customer engage service 50 in a wide variety of ways. The message delivery service that was used to deliver the message could report this information. A client on behalf of whom the message was sent could report this information. A software application provided to a user by the client may report this information to the client, or directly to the customer engagement service. Alternatively, elements of the customer engagement service 50 itself may be capable of determining whether the user opens and/or views the message.

If the determination made in step S504 is that the user did not open or view or listen to the message, the method proceeds to step S506, where the pressure score for the user is increased. The method then loops back to step S502 and the steps described above repeat.

If the determination made in step S504 is that the user did open or view or listen to the message, the method proceeds to step S506, where the pressure score for the user is decreased. The method then loops back to step S502 and the steps described above repeat.

The method can proceed indefinitely, as more and more messages are sent to the user over time. The more often that a user opens/views messages sent to him, the lower the user's pressure score will become, indicating the user is highly receptive to new messages. The less frequently the user opens/views messages, the higher the user's pressure score will become, indicating the user is not highly receptive to new messages.

In such a method, there may be a limit as to how much a user's pressure score can be adjusted. For example, even if the user opens every message that is sent to him, the adjustments made in step S508 may not be allowed to adjust the user's pressure score below zero. Similarly, there may be an upper bound for the user's pressure score.

In addition, a user's pressure score may be reset to a default or baseline value, or to a desired value, for various reasons. This could be a manual adjustment made by a system administrator. Alternatively, a user's pressure score could be automatically reset on a periodic basis.

A user's activity or actions might also trigger an adjustment to the user's pressure score. For example, if a user has a relatively high pressure score, and the user makes a purchase from the client, then the purchase by the user might cause the user's pressure score to be reduced or reset to an initial value.

A user's pressure score might also be automatically reduced over time. For example, when a user's pressure score has become very high, the user will receive few if any messages. However, the user's pressure score might be reduced by one point every day. When the pressure score becomes sufficiently low, the user will once again begin receiving messages. The end result would be that the user is given a break from messaging for a certain period of time, and then messaging resumes. This tactic might be effective at reengaging the user.

A user's pressure score might also be treated differently than normal during certain periods of time. For example, a new user may be treated as having a low pressure score for X number of days after becoming a new user, regardless of whether the user is opening and reading messages. Thereafter, the user's pressure score could be subject to the normal adjustment policies that are in effect.

If the customer engagement service 50 maintains multiple different pressure scores for each user, the method described above could be individually performed for each different type of pressure score.

In some embodiments, the determination made in step S504 may be time bounded. In other words, the question is not simply whether the user ever opens or views the message, but instead whether the user opens or views the message within a predetermined period of time after the message was sent. If the user has not opened/viewed the message within the predetermined period of time, then after step S504 the method proceeds to step S506 and the user's pressure score is increased.

In some embodiments of the invention, the determination made in step S504 may be a multiple part question. For example, the question could be whether the user opens/views a message within a first relatively short predetermined period of time after the message was sent, and if not, whether the user opens/views the message within a second, longer predetermined period of time after the message was sent. If the user opens the message within the first short predetermined period of time, then step S508 could involve decreasing the user's pressure score by a first relatively large amount. If the user opens the message within the second longer predetermined period of time, then in step S508 the user's pressure score would be reduced by a second smaller amount.

Figure 5:
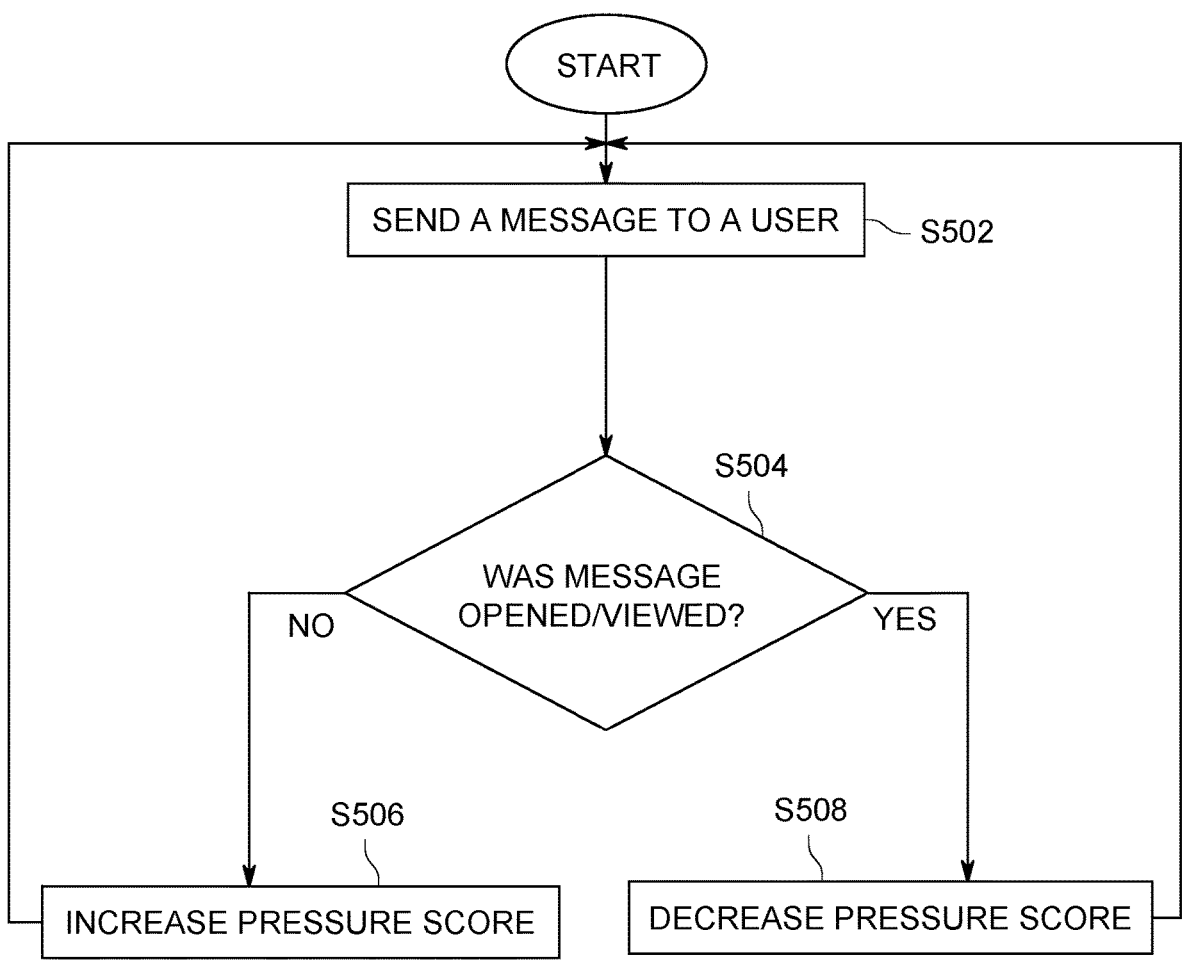
FIG. 5 is a flowchart illustrating steps of a second method embodying the invention.

In a method as illustrated in FIG. 5, a single pressure score is being maintained and adjusted for a user. That does not mean that the user does not have other pressure scores that also are being maintained and adjusted, but rather that the method illustrated in FIG. 5 is only concerned with maintaining one pressure score for the user.

In a method as illustrated in FIG. 5, the individual adjustments being made to the pressure score could vary in value or degree depending on the type of message that was sent, or depending on the topic or subject of the message, or for other reasons. For example, if the message sent in step S502 is a push notification, and in step S504 it is determined that the user opened and viewed the push notification, then in step S508 the user's pressure score could be reduced by a first amount. However, if the message sent in step S502 is a text message, and in step S504 it is determined that the user opened and viewed the text message, then in step S508 the user's pressure score could be reduced by a second amount that is different from the first amount. Similarly, the amount by which a user's pressure score is adjusted in step S506 may vary depending on type of the message, or the topic or subject of the message.

Figure 6:
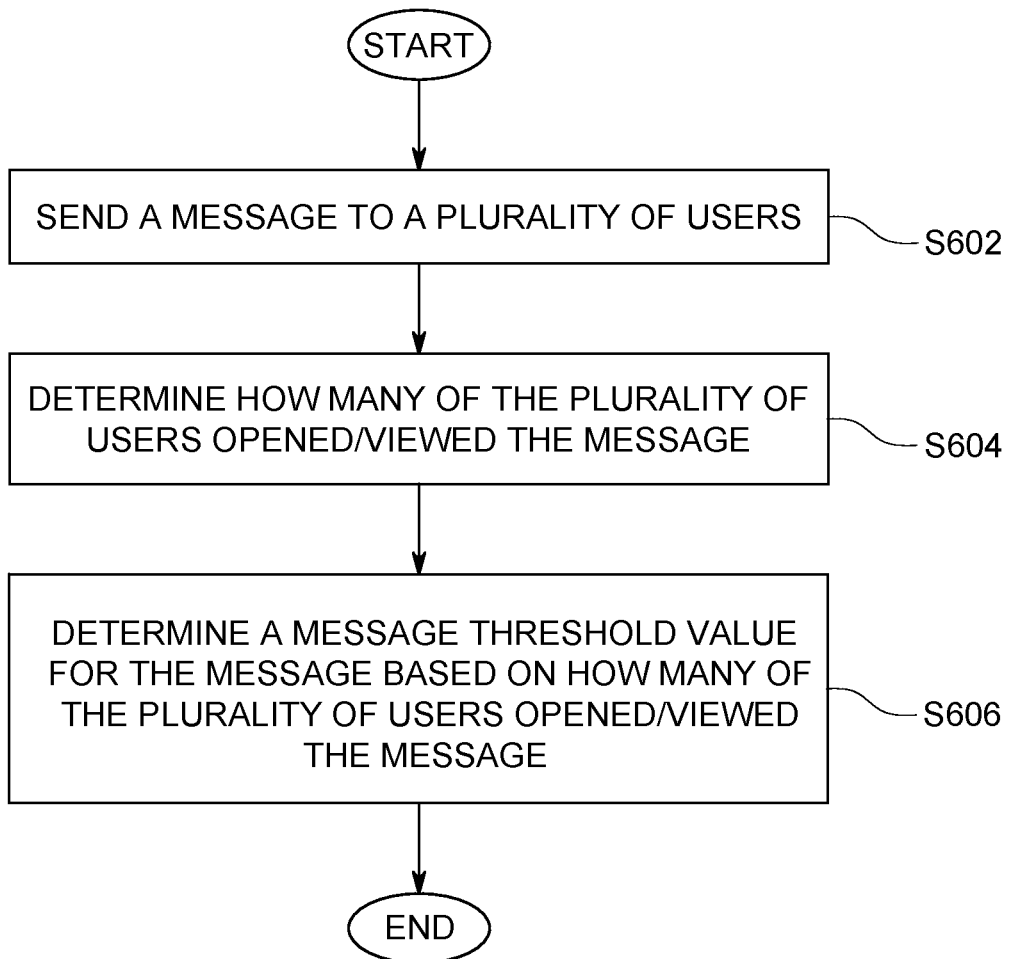
FIG. 6 is a flowchart illustrating steps of a third method embodying the invention.

As mentioned above, messages may have an associated message threshold value to which a user's pressure score is compared to determine if the message should be sent to the user. FIG. 6 illustrates one method for assigning a message threshold value to a message.

The method 600 begins and proceeds to step S602, where a message is sent to a plurality of users. The message is one that will be sent to other users after a message threshold value has been established for the message. Thus, the plurality of users to which the message is sent in step S602 are being used as part of a test to determine how interesting or valuable the message is likely to be to users.

The method then proceeds to step S604, where a message threshold value determining unit 306 of the pressure score unit 300 determines how many of the plurality of users opened or viewed the message. As noted above, this information can be reported to the customer engagement service 50 in a variety of ways, or the customer engagement service 50 may itself be capable of making this determination for some or all of the plurality of users.

Figure 4:
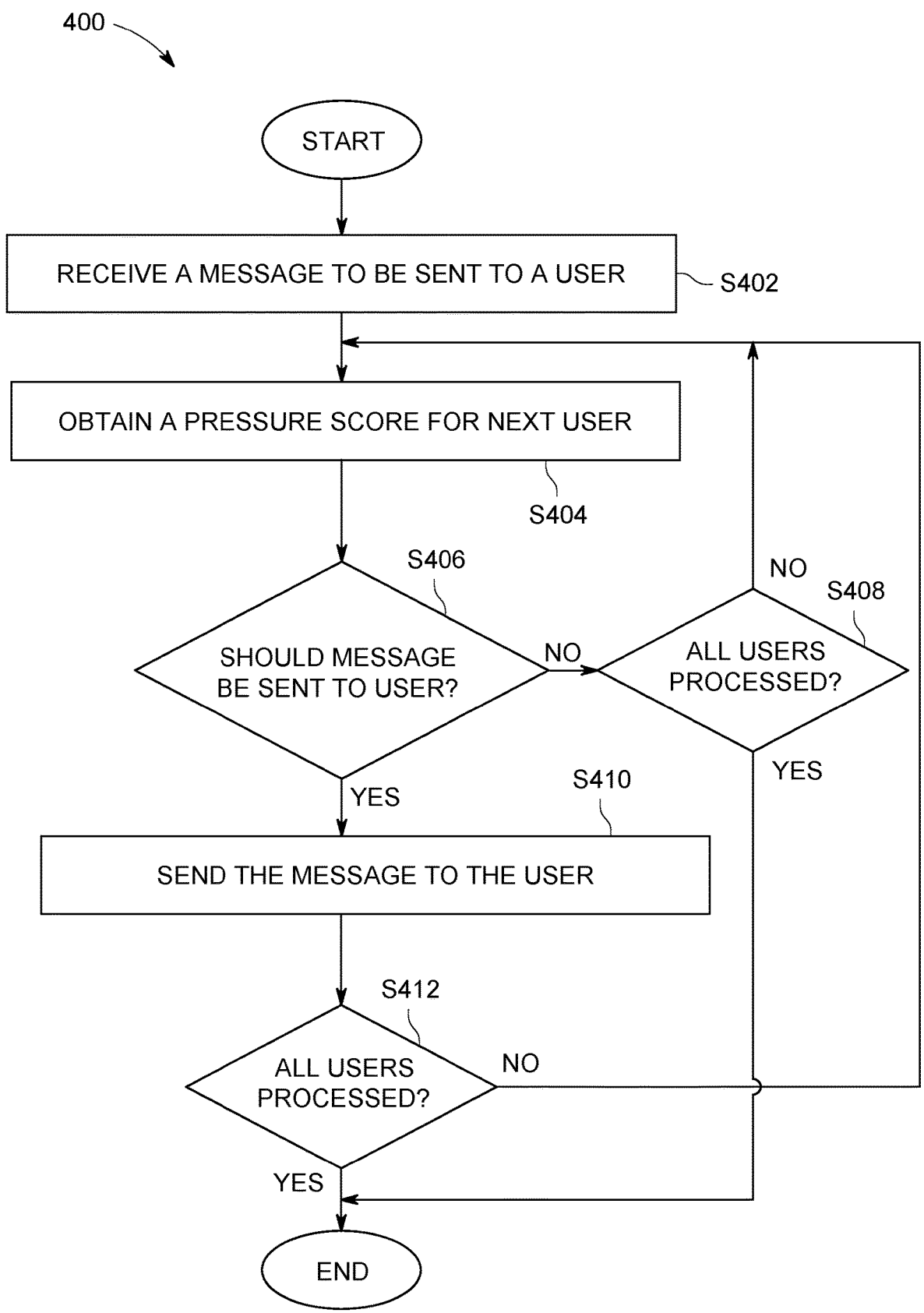
FIG. 4 is a flowchart illustrating steps of a first method embodying the invention.

In step S606, the message threshold value determining unit 306 determines a message threshold value for the message based on the result of the determination in step S604. If the majority of the plurality of users opened/viewed the message, that would indicate that the message is quite interesting to users. In that case, in step S606 the message is assigned a relatively high message threshold value. As a result, the message will be sent, in a method as illustrated in FIG. 4, to most users, even to those users that have a high pressure score. On the other hand, if the message is not opened/viewed by most of the plurality of users, in step S606 the message is assigned a relatively low pressure score. As a result, a method as illustrated in FIG. 4 would end up sending the message only to those users with a relatively low pressure score. The method then ends.

In some embodiments, the determination made in step S604 is time bounded. In other words, step S604 involves determining how many of the plurality of users opened/viewed the message within a predetermined period of time after the message was sent. If the message is quickly opened or viewed by a certain percentage of the plurality of users, then step S606 could involve assigning a relatively high message threshold value, indicating the message was quite interesting.

The determination made in step S606 could depend on multiple factors. The message threshold value could be set based on the percentage of the plurality of users that view the message within a predetermined period of time, as well as the percentage to the plurality of users that view the message before a cutoff time.

In some embodiments, the plurality of users to which the message is sent would be randomly selected. This would help to ensure that the message threshold value assigned to the message is likely representative of the average degree to which all users will find the message interesting or valuable.

In alternate methods, the plurality of users to which the message is sent may be deliberately selected to achieve certain analysis goals. For example, the plurality of users could be those users who already have a high pressure score for the type of message being sent. As a result, if a large number of the plurality of users open/view the message, it would be strong evidence that the message is quite interesting or valuable to users.

Conversely, the plurality of users may be users that have a relatively low pressure score for the type of message being sent. If a large number of those users fail to open/view the message, it would be strong evidence that the message is of very little interest or value to users.

A pressure score as described above might also be used in other ways to assist the customer engagement service in accomplishing its goals. One way relates to the delivery of email messages.

As noted above, the email messages that are sent by the client engagement service 50 to the users may be delivered by third party email services. Such third party email services employ various tactics to prevent or eliminate the delivery of SPAM messages. For example, when a third party email service receives for delivery a large number of highly similar messages, the email service may send only a first portion of the messages to the indicated users. The email service then waits to see if those messages are ignored by the users to which they were delivered, to see if they are moved into SPAM folders, and to see if users delete the message without reading it. If those types of activities occur for a large percentage of the messages from the first block that was sent to users, the email service may decide the messages likely are SPAM, in which case the email service may refuse to deliver the remaining messages. On the other hand, if a relatively large percentage of the users to which the first block of email messages was sent open and read the message, the email service may determine that the message is legitimate, and the email service will then send the remaining messages on to the addressed users.

In view of the SPAM reduction practices employed by email services, the customer engagement service 50 can use the pressure scores of the users to identify those users that are most likely to open or read email messages—those being the users with low pressure scores. When the customer engagement service 50 is tasked by a client with delivering an email message to the client's users, the customer engagement service 50 could send a first block of email messages to those users with a low pressure score. Because users with a low pressure score have demonstrated that they are receptive to messages, the users will likely open and read the email message. This will signal to the email service that the message is not likely SPAM. As a result, the email service is unlikely to block the email message when the customer engagement service 50 thereafter sends the same email message to other users with higher pressure scores.

Pressure scores might also be used to test various different versions of a message in an attempt to determine which version of the message is most likely to be interesting or engaging to users. For example, if a client has tasked the customer engagement service 50 with sending a message to the client's users, the customer engagement service 50 could create several different versions of the message that all include essentially the same content. The subject line of the message could be different in each of the different versions. Also, the content of the message could be slightly varied in the various different versions. Each of the versions could be sent to a different group of users, all of which have a relative high pressure score, indicating they generally are not receptive to new messages. If one of the version of the message is read by a relative high percentage of the group of users to which it was sent, this would indicate that the version sent to that group is particularly interesting or engaging. That version of the message could then be sent to all other users. Operating in this fashion would likely result in the largest number of users opening and reading the message.

Conversely, the customer engagement service 50 could send different versions of a message first to different groups of users with relatively low pressure scores to see which of the versions has the highest engagement factor with users. Only the version(s) with the highest engagement factor would thereafter be sent to users with a relative high pressure score. Operating in this fashion might avoid irritating the users with high pressure scores, while still obtaining information about which of the versions appears to most interesting or engaging to users.

Pressure scores might also be used to control or determine the delivery channel for a message. Many users view push notifications as somewhat invasive, whereas users view email messages or in-app messages as less invasive. Thus, the customer engagement service 50 could send a particular message via a push notification to those users who have a low pressure score, indicating they are relative receptive to new messages. The same message could be sent to users with a high pressure score as an email message or an in-app message. Thus, a user's pressure score could be used to select the delivery channel through which a message is sent to the user.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 7:
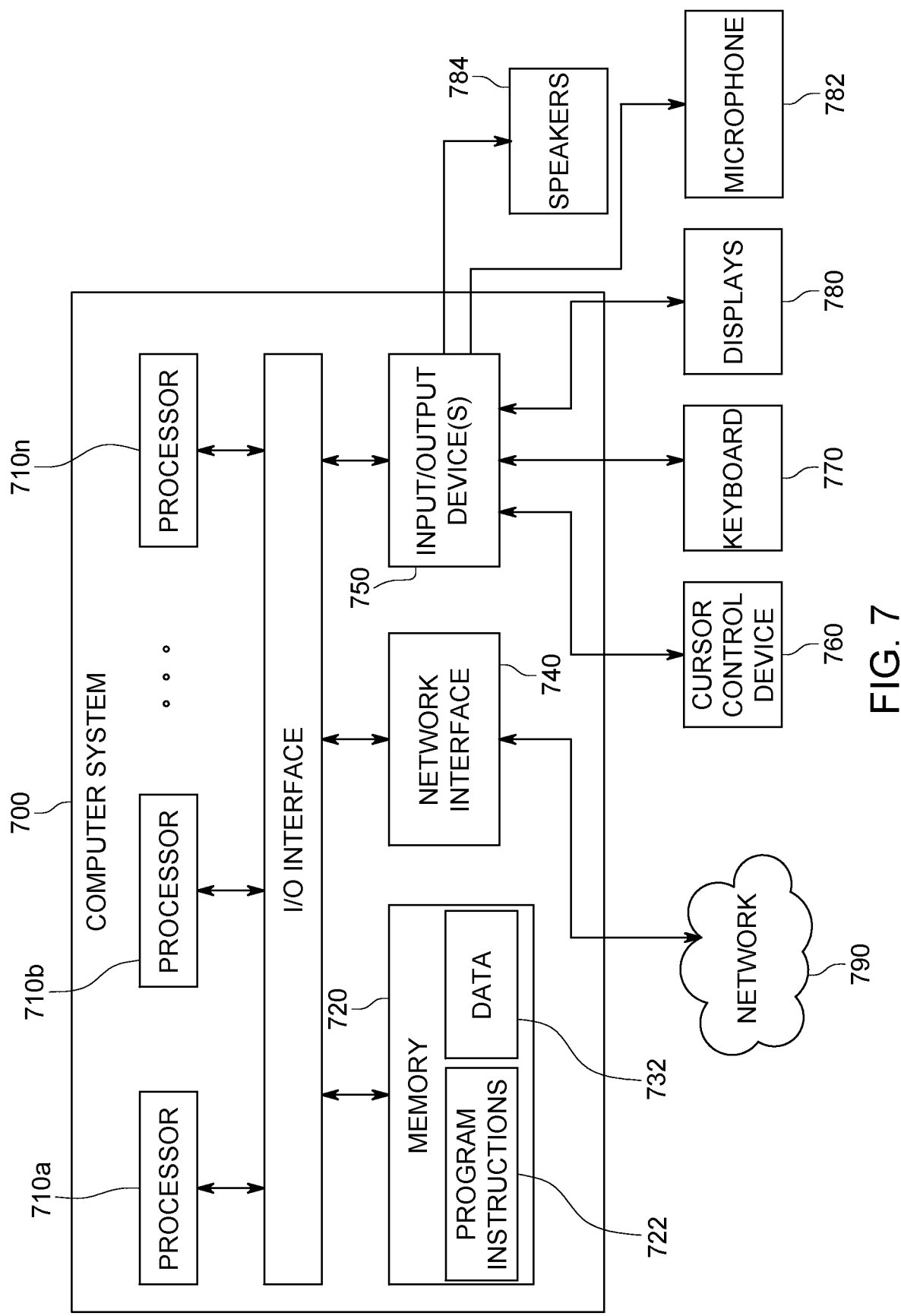
FIG. 7 is a diagram of a computer system and associated peripherals which could embody the invention, or which could be used to practice methods embodying the invention.

FIG. 7 depicts a computer system 700 that can be utilized in various embodiments of the present invention to implement the invention according to one or more embodiments. The various embodiments as described herein may be executed on one or more computer systems, which may interact with various other devices. One such computer system is the computer system 700 illustrated in FIG. 7. The computer system 700 may be configured to implement the methods described above. The computer system 700 may be used to implement any other system, device, element, functionality or method of the above-described embodiments. In the illustrated embodiments, the computer system 700 may be configured to implement the disclosed methods as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, display(s) 780, microphone 782 and speakers 784. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, the computer system 700 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the operations and methods described above, such as the methods illustrated by the flowcharts of FIGS. 4-6. In other embodiments, different elements and data may be included.

Those skilled in the art will appreciate that the computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or nonvolatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer implemented method of sending a message to a user, comprising:
   receiving a message that is to be sent to a user;
   obtaining a pressure score for the user that is indicative of how receptive the user is to receiving messages in general, regardless of the topic of the messages;
   determining, based on at least the user's obtained pressure score, whether the message should be sent to the user; and
   sending the message to the user when it is determined that the message should be sent to the user.

2. The method of claim 1, wherein determining whether the message should be sent to the user comprises determining whether the user's pressure score is equal to or below a threshold value.

3. The method of claim 1, wherein determining whether the message should be sent to the user comprises determining whether the user's pressure score is equal to or below a message threshold value associated with the message.

4. The method of claim 3, wherein the message threshold value associated with the message is based upon how engaging or interesting the message was to other users.

5. The method of claim 3, wherein the message threshold value is representative of a percentage of other users that received the message and then opened or viewed the message.

6. The method of claim 1, wherein the received message includes an indication of a topic or subject or the message, wherein obtaining a pressure score for the user further comprises obtaining a topical pressure score for the user that is indicative of how receptive the user is to receiving messages that are directed to the topic or subject of the message, and wherein the determination of whether the message should be sent to the user is based, at least in part, on the obtained topical pressure score for the user.

7. The method of claim 1, wherein the received message is of a certain type, wherein obtaining a pressure score for the user further comprises obtaining a type pressure score for the user that is indicative of how receptive the user is to receiving messages of the type of the received message, and wherein the determination of whether the message should be sent to the user is based, at least in part, on the obtained type pressure score for the user.

8. A system for sending a message to a user, comprising:
a message sending unit comprising at least one processor that is configured to receive a message that is to be sent to a user;
a pressure score unit comprising at least one processor that is configured to obtain a pressure score for the user that is indicative of how receptive the user is to receiving messages in general, regardless of the topic of the messages, and to determine, based on at least the user's obtained pressure score, whether the message should be sent to the user;
wherein the message sending unit sends the message to the user when the pressure score unit determines that the message should be sent to the user.

9. The system of claim 8, wherein the pressure score unit compares the user's pressure score to a threshold value and determines that the message should be sent to the user when the user's pressure score is equal to or below the threshold value.

10. The system of claim 8, wherein the pressure score unit compares the user's pressure score to a message threshold value associated with the message and determines that the message should be sent to the user when the user's pressure score is equal to or below the message threshold value.

11. The system of claim 10, wherein the message threshold value associated with the message is based upon how engaging or interesting the message was to other users.

12. The system of claim 10, wherein the message threshold value is representative of a percentage of other users that received the message and then opened or viewed the message.

13. The system of claim 8, wherein the received message includes an indication of a topic or subject or the message, wherein the pressure score unit also obtains a topical pressure score for the user that is indicative of how receptive the user is to receiving messages that are directed to the topic or subject of the message, wherein the pressure score unit compares the obtained topical pressure score for the user to a threshold value and determines that the message should be sent to the user when the user's topical pressure score is equal to or below the threshold value.

14. The system of claim 8, wherein the received message is of a certain type, wherein the pressure score unit also obtains a type pressure score for the user that is indicative of how receptive the user is to receiving messages of the type of the received message, wherein the pressure score unit compares the obtained type pressure score for the user to a threshold value and determines that the message should be sent to the user when the user's type pressure score is equal to or below the threshold value.

* * * * *